US012663509B2

(12) United States Patent

Kurz et al.

(10) Patent No.: US 12,663,509 B2

(45) Date of Patent: Jun. 23, 2026

(54) METHOD FOR CORRECTING A RADAR SIGNAL TO DETERMINE A SYNTHETIC APERTURE, COMPUTER PROGRAM, DEVICE, AND VEHICLE

(71) Applicant: Volkswagen Aktiengesellschaft, Wolfsburg (DE)

(72) Inventors: Heiko Gustav Kurz, Hannover (DE); Thomas Gisder, Wolfsburg (DE); Marc-Michael Meinecke, Sassenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 345 days.

(21) Appl. No.: 18/447,224

(22) Filed: Aug. 9, 2023

(65) Prior Publication Data

US 2024/0053436 A1 Feb. 15, 2024

(30) Foreign Application Priority Data

Aug. 15, 2022 (DE) .......................... 102022208465.9

(51) Int. Cl.
| | |
|---|---|
| *G01S 7/40* | (2006.01) |
| *G01S 13/90* | (2006.01) |
| *G01S 13/931* | (2020.01) |

(52) U.S. Cl.
CPC ............... *G01S 7/40* (2013.01); *G01S 13/90* (2013.01); *G01S 13/931* (2013.01)

(58) Field of Classification Search
CPC .......... G01S 7/40; G01S 13/90; G01S 13/931; G01S 13/26; G01S 7/2883

(Continued)

(56) References Cited

U.S. PATENT DOCUMENTS

| | | | | |
|---|---|---|---|---|
| 5,694,130 A | * | 12/1997 | Suzuki | .................... G01S 13/34 342/72 |
| 6,606,052 B1 | * | 8/2003 | Miyahara | .............. G01S 13/584 342/107 |

(Continued)

FOREIGN PATENT DOCUMENTS

| | | |
|---|---|---|
| DE | 102015100134 A1 | 7/2015 |
| DE | 102014218092 A1 | 3/2016 |

(Continued)

OTHER PUBLICATIONS

German Priority Application No. 102022208465.9. Examination Report (Mar. 24, 2023).

(Continued)

*Primary Examiner* — Nuzhat Pervin

(74) *Attorney, Agent, or Firm* — Peter Zura; LOZA & LOZA, LLP

(57) ABSTRACT

Technologies and techniques for correcting a radar signal to determine a synthetic aperture. Data indicative of the radar signal is received, the radar signal having a sequence of echoes from a target region and being based on a sequence of transmission pulses. A movement of at least one target object in the target region is determined, and correction information for the radar signal is determined, based on the movement of the target object. An influence of the movement of the target object on the radar signal is reduced, based on the correction information to obtain a corrected radar signal.

20 Claims, 9 Drawing Sheets

100

Receiving data indicative of a radar signal, wherein the radar signal comprises a sequence of echoes from a target area and is based on a sequence of transmit pulses — 110

Determining the motion of at least one target object within the target area — 120

Determining correction information of the radar signal based on the motion of the target object — 130

Reducing an impact of the target object's motion on the radar signal based on the correction information to obtain a corrected radar signal — 140

(58) Field of Classification Search
USPC ......................................................... 342/25
See application file for complete search history.

(56) References Cited

U.S. PATENT DOCUMENTS

| | | | |
|---|---|---|---|
| 6,765,526 B1* | 7/2004 | Doerry ................ | G01S 13/5242 |
| | | | 342/160 |
| 9,255,988 B2* | 2/2016 | Zeng ................... | G01S 13/9029 |
| 9,448,300 B2* | 9/2016 | Jansen ..................... | G01S 13/34 |
| 9,541,637 B2* | 1/2017 | Searcy ................... | H03M 7/30 |
| 9,958,541 B2* | 5/2018 | Kishigami ............. | G01S 13/26 |
| 10,222,470 B2* | 3/2019 | Addison ............... | G01S 13/931 |
| 10,274,594 B2* | 4/2019 | Pokrass ................. | G01S 13/18 |
| 10,416,284 B2* | 9/2019 | Addison ................ | G01S 7/414 |
| 10,557,933 B2* | 2/2020 | Kishigami ......... | G01S 13/5242 |
| 10,866,306 B2* | 12/2020 | Maher ..................... | G01S 7/352 |
| 10,942,256 B2* | 3/2021 | Achour ................... | H01Q 3/36 |
| 11,119,186 B2* | 9/2021 | Roh ........................ | G01S 13/42 |
| 11,131,766 B2* | 9/2021 | Yan ....................... | G01S 13/589 |
| 11,415,692 B2* | 8/2022 | Park ....................... | G01S 7/352 |
| 11,467,276 B2* | 10/2022 | Gipson ................. | G01S 7/4808 |
| 11,789,114 B2* | 10/2023 | Roger .................. | G01S 13/347 |
| | | | 342/112 |
| 11,802,939 B2* | 10/2023 | Choi .................... | G01S 13/931 |
| 11,874,395 B2* | 1/2024 | Roh ...................... | G01S 13/536 |
| 11,949,763 B2* | 4/2024 | Sukumaran .......... | G01S 13/343 |
| 12,038,494 B2* | 7/2024 | Gipson ................. | G01S 17/89 |
| 12,111,410 B2* | 10/2024 | John Wilson ........... | G06N 3/08 |
| 12,117,520 B1* | 10/2024 | Armstrong-Crews ....................... |
| | | | G01S 13/86 |
| 12,235,341 B2* | 2/2025 | Jadidian ................. | G01S 13/46 |
| 2006/0049978 A1* | 3/2006 | Siegel ................... | G01S 13/534 |
| | | | 342/194 |
| 2010/0073216 A1* | 3/2010 | Sakamoto ................ | G01S 3/74 |
| | | | 342/146 |
| 2014/0247181 A1* | 9/2014 | Nogueira-Nine ..... | G01S 13/343 |
| | | | 342/128 |
| 2014/0361921 A1* | 12/2014 | Aprile ................. | G01S 13/9029 |
| | | | 342/25 B |
| 2015/0346321 A1* | 12/2015 | Jansen ................... | H03M 7/30 |
| | | | 342/107 |
| 2016/0033631 A1* | 2/2016 | Searcy ................... | G01S 13/18 |
| | | | 342/132 |

| | | | |
|---|---|---|---|
| 2016/0131743 A1* | 5/2016 | Addison ............... | G01S 13/931 |
| | | | 342/196 |
| 2016/0131744 A1* | 5/2016 | Addison ................. | G01S 7/354 |
| | | | 342/196 |
| 2016/0377711 A1* | 12/2016 | Arage ................... | G01S 13/584 |
| | | | 342/118 |
| 2017/0090013 A1* | 3/2017 | Paradie ................. | G01S 7/2926 |
| 2019/0041494 A1* | 2/2019 | Roger .................... | G01S 7/003 |
| 2019/0285725 A1* | 9/2019 | Roger .................... | G01S 7/023 |
| 2019/0317205 A1* | 10/2019 | Meissner ............... | G01S 7/354 |
| 2020/0132832 A1* | 4/2020 | Alalusi ................. | G01S 13/886 |
| 2021/0055382 A1* | 2/2021 | Kong ................... | G01S 7/4052 |
| 2021/0208236 A1* | 7/2021 | John Wilson .......... | G01S 7/354 |
| 2021/0255278 A1* | 8/2021 | Roger .................. | G01S 13/584 |
| 2021/0333385 A1* | 10/2021 | Rohani .................. | G01S 13/87 |
| 2021/0405184 A1* | 12/2021 | Schindler ............. | G01S 13/931 |
| 2022/0099819 A1* | 3/2022 | Rajendran ............. | G01S 13/42 |
| 2022/0146660 A1* | 5/2022 | Singh ................... | G01S 13/426 |
| 2023/0063224 A1* | 3/2023 | Nugraha ................ | G01S 13/86 |
| 2023/0118317 A1* | 4/2023 | Melzer .................. | G01S 13/50 |
| | | | 375/346 |
| 2023/0144333 A1* | 5/2023 | Yoffe ................... | G01S 13/931 |
| | | | 342/70 |
| 2023/0213614 A1* | 7/2023 | Choi ...................... | G01S 7/354 |
| | | | 342/107 |
| 2023/0288555 A1* | 9/2023 | Sanson ................... | G01S 7/354 |
| 2023/0305140 A1* | 9/2023 | Annavajjala ........... | G01S 7/354 |
| 2024/0094338 A1* | 3/2024 | Choi ................... | G01S 7/356 |
| 2024/0248193 A1* | 7/2024 | Choi ...................... | G01S 13/34 |
| 2024/0272275 A1* | 8/2024 | Rao ....................... | G01S 13/343 |
| 2025/0004126 A1* | 1/2025 | Armstrong-Crews .. | H03M 7/30 |
| 2025/0086841 A1* | 3/2025 | Nugraha ............... | G01S 13/867 |

FOREIGN PATENT DOCUMENTS

| | | | | |
|---|---|---|---|---|
| DE | 102020207879 A1 | 12/2021 | | |
| EP | 2950451 A1 * | 12/2015 | .......... | G01S 15/931 |
| EP | 3147685 B1 | 3/2017 | | |

OTHER PUBLICATIONS

Farhadi et al. "Synthetic aperture radar imaging of moving targets for automotive applications." Proc. 18th European Radar Conference (Apr. 5-7, 2022), London UK.

* cited by examiner

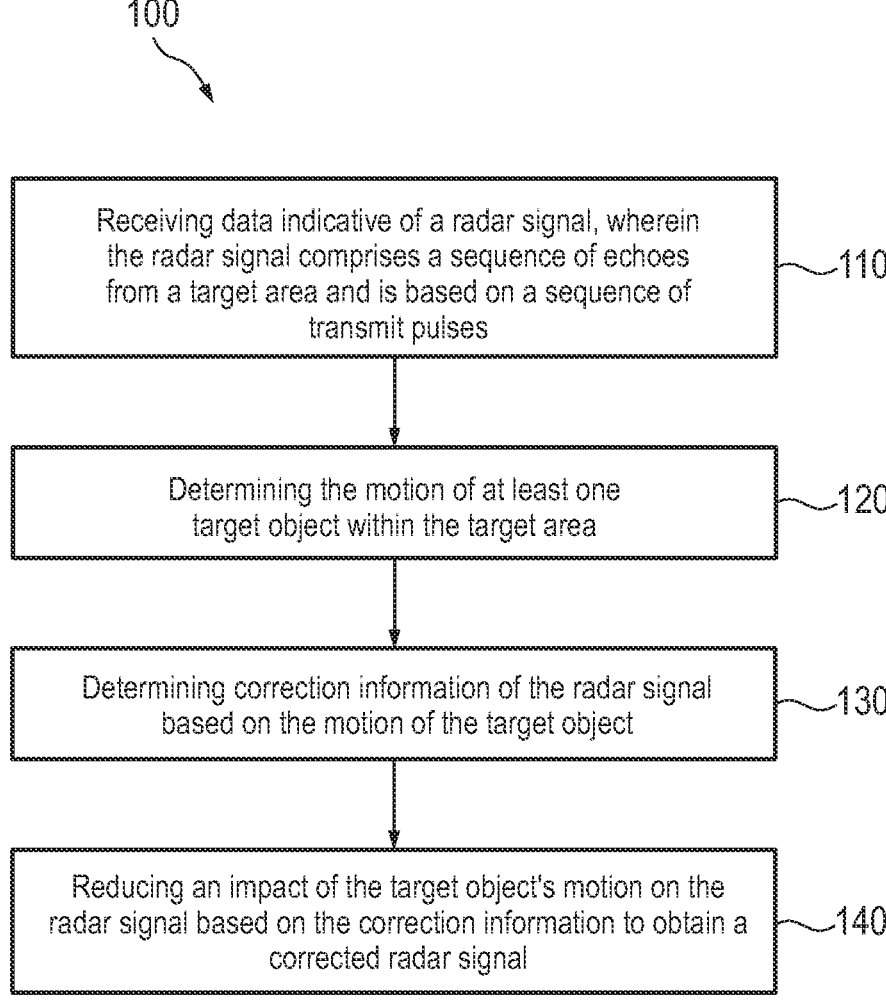

100

Receiving data indicative of a radar signal, wherein the radar signal comprises a sequence of echoes from a target area and is based on a sequence of transmit pulses — 110

Determining the motion of at least one target object within the target area — 120

Determining correction information of the radar signal based on the motion of the target object — 130

Reducing an impact of the target object's motion on the radar signal based on the correction information to obtain a corrected radar signal — 140

METHOD FOR CORRECTING A RADAR SIGNAL TO DETERMINE A SYNTHETIC APERTURE, COMPUTER PROGRAM, DEVICE, AND VEHICLE

CROSS REFERENCE TO RELATED APPLICATION

The present application claims priority to German Patent Application No. DE 10 2022 208 465.9, to Kurz, et al., filed Aug. 15, 2022, the contents of which being incorporated by reference in its entirety herein.

FIELD OF TECHNOLOGY

The present disclosure relates to technologies and techniques for correcting a radar signal for determining a synthetic aperture to a computer program, to a device for correcting a radar signal for determining a synthetic aperture, and to a vehicle. In particular, but not exclusively, embodiments of the present disclosure relate to techniques for radar signal processing.

BACKGROUND

The safest possible detection of surroundings is essential for automated vehicle driving. Sensors such as radar, lidar, or cameras are used in the vehicle. A holistic 360° 3D capture is particularly important, so that all static and dynamic objects in the surroundings are captured. The lidar in particular plays a key role in redundant, robust surroundings detection, since this type of sensor can measure precise distances and can also be used for classification. However, these sensors are expensive and complex in their construction. In particular, the 360° 3D surroundings detection is problematic, since either many smaller individual sensors, i.e., many individual light sources and detector elements, or large sensors are required. Furthermore, lidar systems are susceptible to weather influences such as rain, fog, or direct sunlight.

Radar sensors have been established in the automotive sector for years and deliver reliable and fail-safe data in all weather conditions. Even poor visibility conditions such as rain, fog, snow, dust, smoke, and darkness hardly affect their detection reliability.

DE 10 2015100134 A1 proposes a method for detecting and tracking objects using multiple radar sensors. Objects relative to a host vehicle are detected from radar data generated by a detector.

The radar data comprises Doppler measurement data. Clusters are formed by a processor as a function of the radar data. Each cluster represents a respective object. Each object is classified by the processor as stationary or non-stationary based on each object's Doppler measurement data and on a vehicle speed of the host vehicle. In response to the object being classified as a non-stationary object, a target track is applied by the processor to an object using the Doppler measurement data over time; otherwise, in response to classifying the object as a stationary object, an occupancy grid is updated.

EP 3 147 685 B1 proposes a radar system of a vehicle which comprises at least one transceiver arrangement which is arranged in such a way that it generates and transmits two frequency-modulated continuous wave (FMCW) chirp signals. The chirp signals comprise corresponding frequency ramps. The radar system comprises at least two transmitting antenna arrays and at least one receiving antenna array arranged to receive signals reflected from an object. At least one transmitting antenna array is arranged to be activated to emit a first chirp signal at first points in time, and at least one other spatially separated transmitting antenna array is arranged to be activated to emit a second chirp signal at second points in time. The transmitting antenna arrays are interleaved and repeatedly activated such that a synthetic aperture is obtained through the received signals.

DE 10 2014 218 092 A1 proposes a method and a device for imaging the surroundings of a radar of a motor vehicle or for determining the relative vectorial speed between the radar and objects in the surroundings using an angle-measuring FMCW radar with range Doppler evaluation. If the radar, which is moving in a straight line at constant speed, emits signals in the direction of objects in the surroundings of the motor vehicle for a limited period of time, the signals reflected by the objects are received separately by the at least two receiving antennas. The signals received in the limited time period form a group of M different measurement signals for each receiving antenna; each group of M measurement signals is transformed into the frequency domain using a two-dimensional Fourier transformation, and a range Doppler image of each group is generated. A distance relative to the radar is assigned to each pixel of the range Doppler image. To estimate the angle between radar and objects, a conjugate multiplication of the at least two range Doppler images is carried out to form an RDA image, and an image of the surroundings of the radar is generated from the distance information of the pixels of two range Doppler images and the angle information of the corresponding RDA image, or a radar speed is determined for each pixel of the range Doppler images from the corresponding RDA image.

However, the resolution of radar sensors is limited: Serial radar sensors used have a resolution of approx. 2°. In order to meet the requirements for levels 4 and 5 of automated driving with a safe driving function, radar sensors must provide images with a fine resolution in the range of 0.1° and even finer with a high level of immunity to disturbances from their surroundings. This cannot be achieved with conventional radar technology, since the specified physical aperture dictates the resolution of such systems.

Current developments in automotive synthetic aperture radars, in turn, require static surroundings during the synthetic aperture design process.

There is therefore a need to improve a synthetic aperture of a radar sensor in dynamic surroundings. The technologies and techniques disclosed herein take this need into account.

SUMMARY

Embodiments are based on the core idea of correcting a radar signal before creating the synthetic aperture in such a way that the influence of dynamic objects on the radar signal is reduced.

In some examples, a method of correcting a radar signal is disclosed to determine a synthetic aperture. The method comprises receiving data indicative of the radar signal, the radar signal having a sequence of echoes from a target region and being based on a sequence of transmission pulses. The method further comprises determining a movement of at least one target object in the target region, determining correction information for the radar signal based on the movement of the target object, and reducing an influence of the movement of the target object on the radar signal based on the correction information to obtain a corrected radar signal. Each echo in the sequence of echoes can be based, for example, on a respective transmission pulse in the sequence of transmission pulses. The radar signal can, for example, have been generated by a radar sensor moving relative to a reference system. The movement of the target object can be a movement relative to the latter reference system. The method can compensate for signal distortions in the radar signal due to dynamic objects in the target region and thus make it possible to generate a virtually static image of the target region. The method can support imaging reconstruction of the target region by reducing defocus and erroneous projection of dynamic parts of the target region.

In some examples, the method further includes creating the synthetic aperture based on the corrected radar signal. With the help of the corrected radar signal, the method can facilitate the construction of the synthetic aperture since dynamic objects in the target region can remain unconsidered.

In some examples, creating the synthetic aperture may include constructing an image of the target region based on the corrected radar signal. Accordingly, the method based on the corrected radar signal can contribute to improved detection of the surroundings.

In some examples, determining the movement of the target object may include determining a speed of the target object by a two-dimensional Fourier transformation of the radar signal. This allows the speed and distance of the target object to be determined from the radar signal itself and without additional sensors.

In some examples, determining the speed of the target object may include transforming the radar signal into a Doppler range. This can facilitate clustering of target objects according to speed and distance from the radar sensor and thus delimitation of multiple target objects.

In some examples, the method may further include detecting a plurality of moving target objects in the target region, determining a respective piece of correction information of the radar signal based on a movement of each of the detected target objects, and reducing an influence of the movement of each of the detected target objects on the radar signal based on the respective correction information to obtain the corrected radar signal. Distinguishing target objects with potentially different speeds and distances can improve accuracy of the radar signal correction.

In some examples, the influence of the movement of the target objects on the radar signal may be iteratively reduced for each of the detected target objects. As a result, the correction of the radar signal can be adapted to the distorting influence of each of the detected target objects.

In some examples, the method may also include providing the respective correction information for parameterizing at least one respective filter for reducing the influence of the movement of each of the detected target objects on the radar signal. This means that a parameterizable filter bank can be used to speed up the correction of the radar signal by parallelizing the filter operations required for this. For example, the radar signal can be corrected within a pulse sequence.

In some examples, the correction information may be determined based on a movement-induced Doppler frequency shift in the radar signal. In this way, an undesired change in the recorded frequency due to the movement of the target object when the transmission pulse impinges on the target object can be compensated for in an echo.

In some examples, the correction information may be determined based on a movement-induced phase difference between at least two echoes in the sequence of echoes in the radar signal. In this way, an undesired change in distance to the target object reflected in the echoes due to the movement of the target object in the time between the transmission of two transmission pulses can be compensated for.

In some examples, a first piece of correction information $s_1$ may be determined according to $$s_1(v_{r,d}, k) = \exp\left(-2\pi j \ kT_{RRI} \frac{2}{\lambda_c} v_{r,d}\right).$$

In this case, k represents an index of a transmission pulse in the sequence of transmission pulses, $T_{RRI}$ is a time difference between two consecutive transmission pulses in the sequence of transmission pulses, $v_{r,d}$ is a radial speed of the target object, and $\lambda_c$ is a wavelength of the transmission pulse in the sequence of transmission pulses. The correction information may be based on the first correction information $s_1$. A phase of the echo can thus be adjusted in such a way that the corrected radar signal simulates that the target object did not move (or at least moved less) between two consecutive transmission pulses.

In some examples, a second piece of correction information $s_2$ may be determined according to $$s_2(v_{r,d}, t) = \exp\left(-2\pi j \frac{2}{\lambda_c} v_{r,d} t\right).$$

In this case, $v_{r,d}$ is a radial speed of the target object, $\lambda_c$ is a wavelength of a transmission pulse in the sequence of transmission pulses, and t is a measurement time of an echo in the sequence of echoes. The correction information is based on the second correction information $s_2$. A phase of the echo can thus be adjusted in such a way that the corrected radar signal simulates that the target object would not have moved (or at least would have moved less) when the transmission pulse impinged on it.

In some examples, a computer program is disclosed herein for carrying out a method according to the present disclosure when the computer program runs on a computer, to a processor, or to a programmable hardware component. The computer program can compensate for signal distortions in the radar signal due to dynamic objects in the target region, thus making it possible to create a virtual static image of the target region. The computer program can support imaging reconstruction of the target region by reducing defocus and erroneous projection of dynamic parts of the target region.

In some examples, a device is disclosed for correcting a radar signal for determining a synthetic aperture. The device may include an interface circuit configured to receive data indicative of the radar signal. The radar signal may be configured with a sequence of echoes from a target region and is based on a sequence of transmission pulses. The device also may include a processing circuit that is designed to determine a movement of at least one target object in the target region, to determine correction information for the radar signal based on the movement of the target object, and to reduce an influence of the movement of the target object on the radar signal based on the correction information to obtain a corrected radar signal. The device can compensate for signal distortions in the radar signal due to dynamic objects in the target region and thus make it possible to generate a virtually static image of the target region. The device can support imaging reconstruction of the target region by reducing defocus and misprojection of dynamic parts of the target region.

In some examples, a vehicle is disclosed comprising a device according to the present disclosure. The vehicle can have an improved environment detection.

BRIEF DESCRIPTION OF THE DRAWINGS

Embodiments and examples are explained in more detail below with reference to the enclosed figures. In the figures:

FIG. 1 shows a flowchart a method for correcting a radar signal for determining a synthetic aperture, according to some aspects of the present disclosure;

DETAILED DESCRIPTION

Various embodiments and examples will now be described in more detail with reference to the accompanying drawings, in which some embodiments are illustrated. In the figures, the thickness dimensions of lines, layers, and/or regions may be exaggerated for clarity.

FIG. 1 shows a flow chart of an example of a method 100 for correcting a radar signal to determine a synthetic aperture. The method 100 may be computer-implemented, for example.

The method 100 comprises receiving 110 data indicative of the radar signal. The radar signal has a sequence of echoes from a target region and is based on a sequence of transmission pulses. The transmission pulses can be frequency-modulated electromagnetic pulses (chirps). The pulses can have frequencies in the radio wave range, for example, in a frequency range below 3000 gigahertz. The radar signal can have been generated by a radar sensor. The method 100 may be performed, for example, by a device that is integrated with the radar sensor or communicatively coupled to the radar sensor to receive the data.

The radar sensor may have generated the radar signal while moving relative to a reference system, such as in an azimuth direction. During its movement, an antenna of the radar sensor can have emitted the transmission pulses into the target region with a time interval between at least two transmission pulses, for example, periodically. This means that the transmission pulses can have been emitted by the antenna from different measurement points, for example, to scan the target region. The antenna or another antenna of the radar sensor can have received the echoes, it being possible for each of the echoes to be based on a reflection of a respective transmission pulse in the target region. The echoes can thus indicate the target region from a respective perspective. The radar sensor can have generated the radar signal based on a side-looking radar method. The radar signal can be a measurement or reception signal from the radar sensor.

Figure 2:
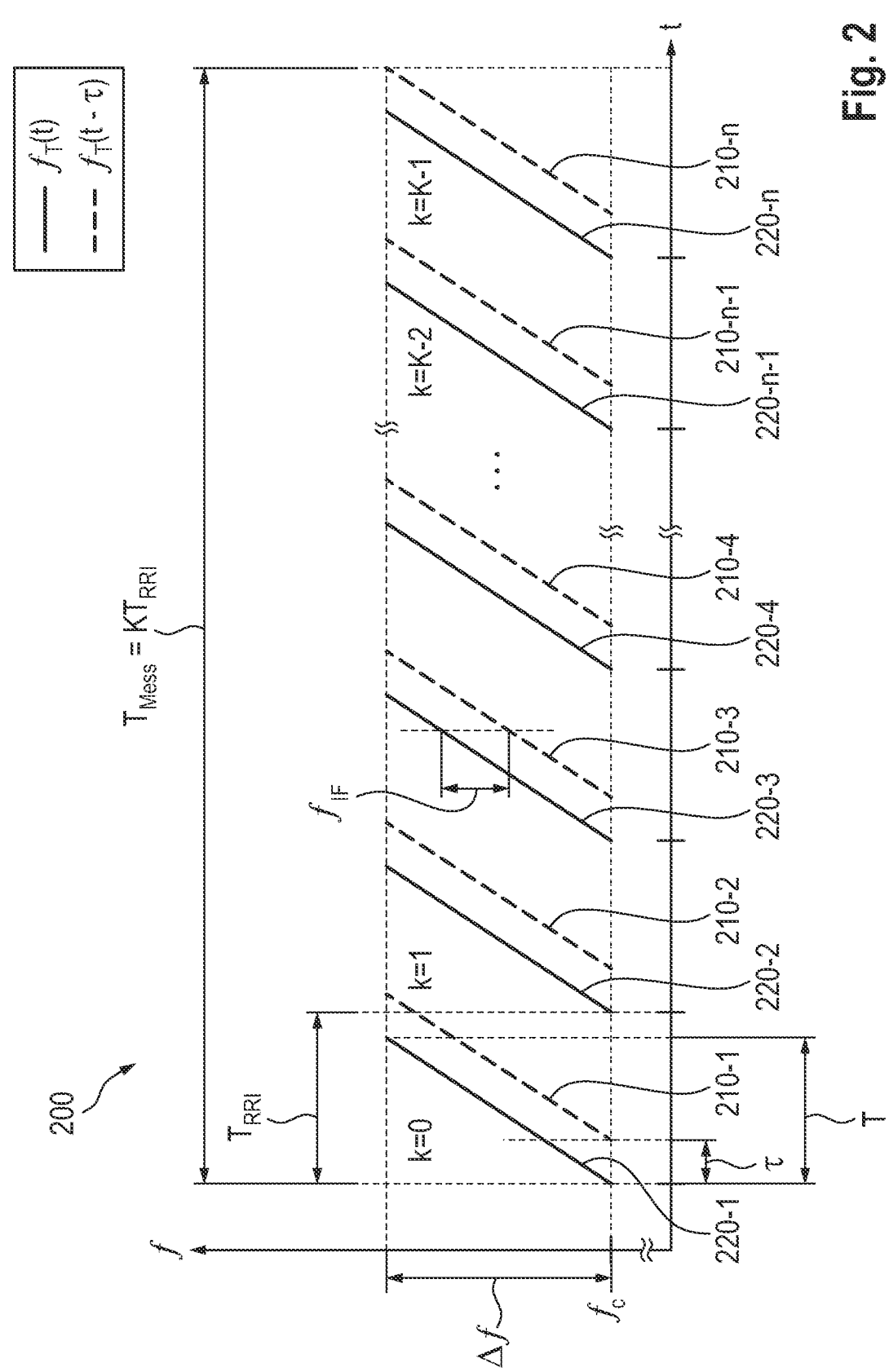
FIG. 2 shows a time-frequency diagram of a sequence of echoes and a sequence of transmission pulses, according to some aspects of the present disclosure.

FIG. 2 shows a time-frequency diagram 200 of an example of a sequence $(f_T(t-\tau))$ of echoes 210-1 to 210-*n* and a corresponding sequence $(f_T(t))$ of transmission pulses 220-1 to 220-*n*. The time-frequency diagram 200 shows the point in time at which each of the transmission pulses 220-1 to 220-*n* was transmitted with which frequency and the point in time at which each of the echoes 210-1 to 210-*n* was received with which frequency. The echoes 210-1 to 210-*n* and the transmission pulses 220-1 to 220-*n* are each arranged at regular intervals on the timeline of the time-frequency diagram 200, i. e., the transmission pulses 220-1 to 220-*n* were transmitted periodically.

The time-frequency diagram 200 represents a modulation dimension of a radar signal that has the sequence of echoes 210-1 to 210-*n* and is based on the sequence of transmission pulses 220-1 to 220-*n*. The echoes 210-1 to 210-*n* are reception ramps of the radar signal, and the transmission pulses 220-1 to 220-*n* are frequency-modulated transmission ramps. The ramps have a positive, linear slope, i.e., the modulation is based on a linear increase in frequency.

The sequences may each include a number K of echoes or transmission pulses. The expansion of one of the transmission pulses 220-1 to 220-*n* over the frequency $\Delta f$ corresponds to the bandwidth of the frequency modulation. The extension of one of the transmission pulses 220-1 to 220-*n* over time T corresponds to the modulation time T. The time difference $T_{RRI}$ between two consecutive transmission pulses corresponds to a repetition interval of the sequence of transmission pulses 220-1 to 220-*n*. From a frequency difference $f_{IF}$ between an echo and a transmission pulse at a specific point in time, a propagation time $\tau$ of the transmission pulse and thus a distance between the radar sensor and a target object at which the transmission pulse was reflected in the form of the echo can be deduced.

It should be noted that the echoes 210-1 to 210-*n* and transmission pulses 220-1 to 220-*n* shown in FIG. 1 only serve to illustrate the technique described herein. In other embodiments, the radar signal can be based on a different number of transmission pulses than indicated in FIG. 1 and have a different number of echoes. The radar signal can be based on $n \geq 2$ transmission pulses and have $m \geq 2$ echoes. In other embodiments, the sequences can have a different form of modulation, for example a negative, falling frequency modulation, or they can be non-periodic, i. e. distributed irregularly over time.

Referring back to FIG. 1, the method 100 may further include determining 120 a movement of at least one target object in the target region. The target region can correspond approximately to the surroundings of the radar sensor that are to be detected.

The movement can be determined, for example, by determining a speed, an acceleration or a movement trajectory of the target object in the target region. For example, a radial speed relative to the radar sensor can be determined. The movement of the target object can relate to a change in location of the target object within a measurement period of the radar signal. The movement of the target object can be a movement relative to the above reference system for a movement of the radar sensor. The movement of the target object may comprise radial speed relative to the radar sensor.

The movement of the target object can be determined, for example, by sensors and transmitted to the device executing the method 100. Alternatively, determining 110 the movement of the target object comprises determining a speed of the target object by a two-dimensional Fourier transformation of the radar signal. This allows the speed and distance of the target object to be determined from the radar signal itself and without additional sensors. In one embodiment, determining 110 the speed of the target object comprises transforming the radar signal into a Doppler range. This can facilitate clustering of target objects according to speed and distance from the radar sensor and thus delimitation of multiple target objects.

Figure 3:
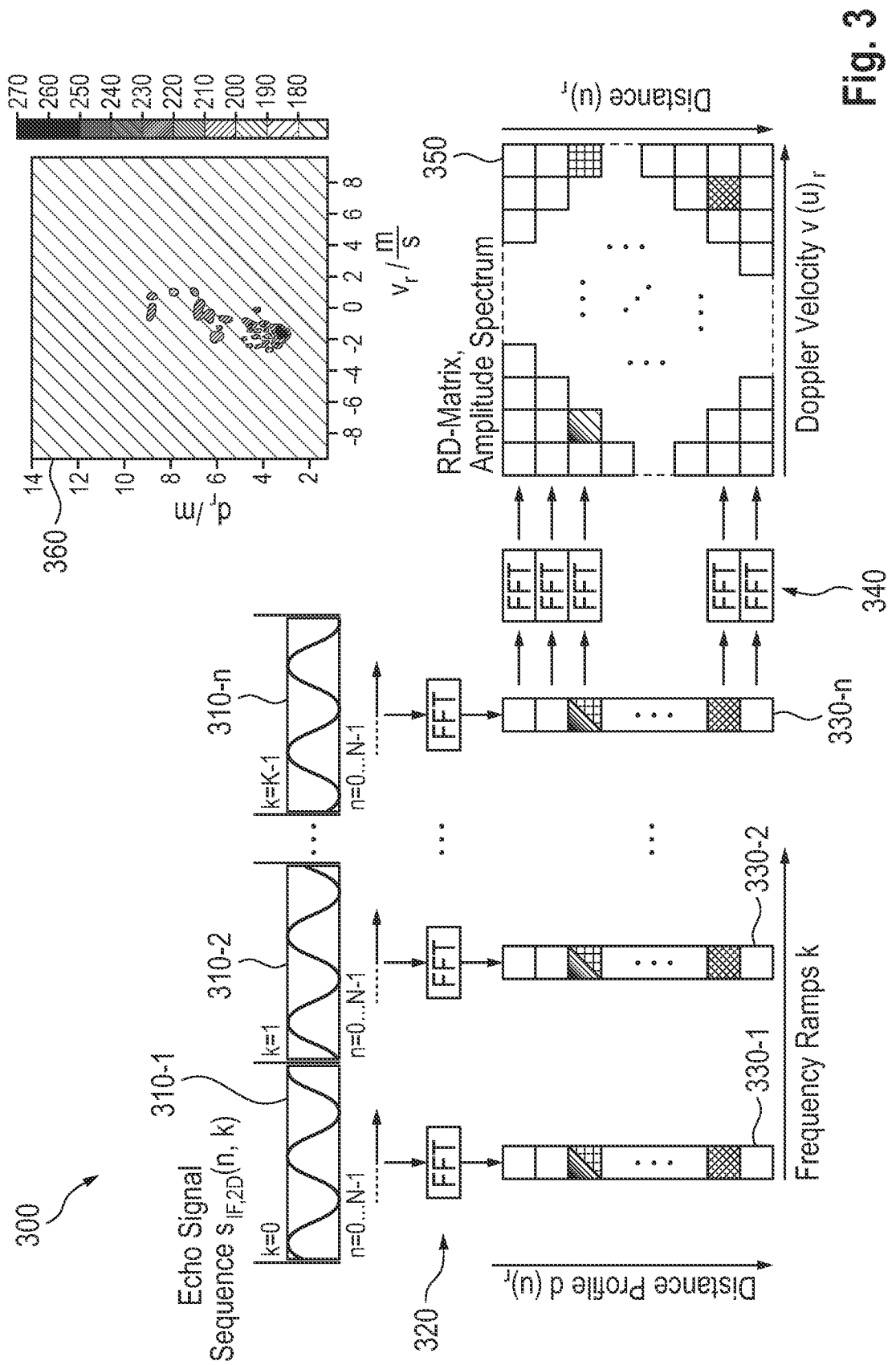
FIG. 3 shows a model representation of a transformation of a radar signal into a Doppler range, according to some aspects of the present disclosure.

FIG. 3 shows a model representation of an example of a transformation 300 of a radar signal into a Doppler range. FIG. 3 illustrates the sequence of data processing steps of such a transformation 300. The transformation 300 may be for determining a speed of a target object in a target region based on the radar signal for a method of correcting the radar signal according to aspects of the present disclosure.

The radar signal has a sequence of echoes 310-1 to 310-n. The echoes 310-1 to 310-n can be described as a function s(t,k) as a function of t as the measurement time of the echoes 310-1 to 310-n and of k as the ramp index. In FIG. 3, the echoes 310-1 to 310-n are shown as time curves of sinusoidal signal sections, which result from the function s(t,k) in this example. It should be noted that the echoes can have a different course in other embodiments.

The function s(t,k) can be determined according to Equation 1, for example:

$$s(t, k) = A\exp\left(2\pi j\frac{2}{\lambda_c}d_r\right)\sum_{k=0}^{k-1}\exp\left(2\pi j\left(2T_{RRI}\frac{2}{\lambda_c}v_r\right)\right)$$
$$\exp\left(2\pi j\left(2\frac{\Delta f}{c_0 T}d_r + \frac{2}{\lambda_c}v_r\right)t\right)rect\left(\frac{t - kT_{RRI}}{T}\right)$$

Equation 1 where A is an amplitude specific to a target object scanned by the radar signal, $v_r$ is a radial speed of the target object, $\lambda_c$ is a wavelength of the transmission pulse corresponding to the respective echo in a sequence of transmission pulses, $T_{RRI}$ is a time difference between two consecutive transmission pulses in the sequence of transmission pulses, $\Delta f$ is a bandwidth of the frequency modulation of the transmission pulses, K is a total number of echoes 310-1 to 210-n, $c_0$ is the speed of light, and d r is a distance to the target object. Rect is a rectangular function according to Equation 2:

$$\text{with } rect(k, t) = \begin{cases} 1 \text{ if } \left|\frac{t - kT_{RRI}}{T}\right| \leq 1 \\ 0 \text{ if } \left|\frac{t - kT_{RRI}}{T}\right| > 1 \end{cases}$$

Equation 2

The transformation 300 comprises a Fourier transformation 320 of each of the echoes 310-1 to 310-n into a range, resulting in respective range vectors 330-1 to 330-n. The transformation 300 comprises a further Fourier transformation 340 of all values of the distance vectors 330-1 to 330-n with the same index following the Fourier transformation 320 into a Doppler range, from which a Range-Doppler matrix 350 results. The Range-Doppler matrix 350 indicates an amplitude spectrum of the echoes 310-1 to 310-n for distances and speeds in the target region derived from the radar signal.

The transformation 300 can be represented mathematically by the function S(u,p) according to Equation 3:

$$S(u, p) = F\{F\{s(t, k)\}\}$$

Equation 3 wherein the index pair (u,p) identifies a matrix element (Range-Doppler cell) of the Range-Doppler matrix 350.

Based on such a Range-Doppler matrix 350, target objects in the target region can be detected using conventional detection methods, such as an order statistics false alarm rate (OS-CFAR) and downstream methods for detecting extreme values. From a resulting target list, those target objects that have a radial speed that is not equal to zero (or greater than a threshold value) can be important for further data processing.

From the Range-Doppler matrix 350, a Range-Doppler map 360 can be constructed. Cells of the matrix 360 that indicate a movement are colored depending on the speed so that target objects in the target region can be better detected. For example, colored cells of the matrix 360 can be clustered, and one target object can thereby be distinguished from another target object on the basis of the respective speed and distance.

Referring back to FIG. 1, the method 100 may further include determining 130 correction information for the radar signal based on the movement of the target object and reducing 140 an influence of the movement of the target object on the radar signal based on the correction information to obtain a corrected radar signal.

For example, the correction information may be determined based on a movement-induced phase difference between at least two echoes in the sequence of echoes in the radar signal. The correction information can thus be used to compensate for an unwanted change in distance to the target object reflected in the echoes due to the movement of the target object in the time between the transmission of two transmission pulses. For example, correction information $s_1$ can be determined according to Equation 4:

$$s_1(v_{r,d}, k) = \exp\left(-2\pi jkT_{RRI}\frac{2}{\lambda_c}v_{r,d}\right)$$

Equation 4 wherein k is an index of a transmission pulse in the sequence of transmission pulses, $T_{RRI}$ is a time difference between two consecutive transmission pulses in the sequence of transmission pulses, $v_{r,d}$ is a radial speed of the target object d, and $\lambda_c$ is a wavelength of the transmission pulse in the sequence of transmission pulses. The correction information can be determined based on the first correction information $s_1$. A phase of the echo can thus be adjusted in such a way that the corrected radar signal simulates that the target object did not move (or at least moved less) between two consecutive transmission pulses.

Alternatively, or additionally, the correction information can be determined based on a movement-induced Doppler frequency shift in the radar signal. The correction information can thus be used to compensate for an undesired change in the detected frequency in an echo due to the movement of the target object when the transmission pulse impinges on the target object. For example, a second piece of correction information $s_2$ can be determined according to Equation 5:

$$s_2(v_{r,d}, t) = \exp\left(-2\pi j \frac{2}{\lambda_c} v_{r,d} t\right)$$

Equation 5

Where $v_{r,d}$ is a radial speed of the target object d, $\lambda_c$ is a wavelength of a transmission pulse in the sequence of transmission pulses, and t is a measurement time of an echo in the sequence of echoes. The correction information can be determined based on the second correction information $s_2$. A phase of the echo can thus be adjusted in such a way that the corrected radar signal simulates that the target object would not have moved (or at least would have moved less) when the transmission pulse impinged on it.

With the help of the correction information, for example, a phase term of the radar signal that depends on the speed of the target object, i.e., a phase term associated with speed, can be reduced in value or ideally completely compensated for. For example, in the example of a radar signal represented by Equation 1, the phase terms represented in Equations 4 and 5 may be compensated.

The method 100 can thus compensate for signal distortions in the radar signal due to dynamic objects in the target region and thus make it possible to generate a virtually static image of the target region. The method 100 can be a support imaging reconstruction of the target region by reducing defocus and misprojection of dynamic parts of the target region.

In one example, the method 100 may further include detecting a plurality of moving target objects in the target region, determining a respective piece of correction information of the radar signal based on a movement of each of the detected target objects and reducing an influence of the movement of each of the detected target objects on the radar signal based on the respective correction information to obtain the corrected radar signal. Distinguishing target objects with potentially different speeds and distances can improve accuracy of the radar signal correction.

For example, the sequence of echoes according to Equation 6 can be represented mathematically as a function s(t,k):

$$s(t, k) = \sum_{z=1}^{z} \sum_{k=0}^{k-1} A_z \exp\left(2\pi j\left(2T_{RRI} \frac{2}{\lambda_c} v_{r,z}\right)\right)$$
$$\exp\left(2\pi j\left(2\frac{\Delta f}{c_0 T} d_{r,z} + \frac{2}{\lambda_c} v_{r,z}\right)t\right) \exp\left(2\pi j \frac{2}{\lambda_c} d_{r,z}\right)$$

Equation 6 where Equation 6 is essentially based on Equation 1 and takes into account possible target objects z with a total number Z of (static/dynamic) target objects.

In one embodiment, the influence of the movement of the target objects on the radar signal is iteratively reduced for each of the detected target objects. As a result, the correction of the radar signal can be adapted to the distorting influence of each of the detected target objects.

For example, the radar signal can be corrected iteratively according to Equations 7 to 11 for each of the detected target objects d of a number D of dynamic target objects in the target region in order to obtain a corrected radar signal $s(t,k)_0$.

For the first target object d=1, the correction results according to Equation 7:

$$s(t, k)_{D-1} =$$

Equation 7

-continued $$\sum_{z=1}^{z} \sum_{k=0}^{k-1} \left(\begin{array}{c} A_z \exp\left(2\pi j\left(2T_{RRI} \frac{2}{\lambda_c} v_{r,z}\right)\right) \exp\left(2\pi j \frac{2}{\lambda_c} d_{r,z}\right) \\ \exp\left(2\pi j\left(2\frac{\Delta f}{c_0 T} d_{r,z} + \frac{2}{\lambda_c} v_{r,z}\right)t\right) \end{array}\right)$$
$$\exp\left(-2\pi jkT_{RRI} \frac{2}{\lambda_c} v_{r,d}\right) \exp\left(-2\pi j \frac{2}{\lambda_c} v_{r,d} t\right)$$

For the second target object d=2, the correction results according to Equation 8:

$$s(t, k)_{D-2} = s_{D-1}(t, k) \exp\left(-2\pi jkT_{RRI} \frac{2}{\lambda_c} v_{r,d}\right) \exp\left(-2\pi j \frac{2}{\lambda_c} v_{r,d} t\right)$$

Equation 8

For the third target object d=3, the correction results according to Equation 9:

$$s(t, k)_{D-3} = s(t, k)_{D-2} \exp\left(-2\pi jkT_{RRI} \frac{2}{\lambda_c} v_{r,d}\right) \exp\left(-2\pi j \frac{2}{\lambda_c} v_{r,d} t\right)$$

Equation 9

The same procedure can be followed for other target objects. For the target object d=D, the correction results according to Equation 10 or 11:

$$s(t, k)_0 = s(t, k)_1 \exp\left(-2\pi jkT_{RRI} \frac{2}{\lambda_c} v_{r,d}\right) \exp\left(-2\pi j \frac{2}{\lambda_c} v_{r,d} t\right)$$

Equation 10

$$s(t, k)_0 = \sum_{z=1}^{z} \sum_{k=0}^{k-1} A_z \exp\left(2\pi j\left(2\frac{\Delta f}{c_0 T} d_{r,z}\right)t\right) \exp\left(2\pi j \frac{2}{\lambda_c} d_{r,z}\right)$$

Equation 11

In some examples, the method 100 may include providing the respective correction information of the target objects for parameterizing at least one respective filter for reducing the influence of the movement of each of the detected target objects on the radar signal. This means that a parameterizable filter bank can be used to speed up the correction of the radar signal by parallelizing the filter operations required for this. For example, the radar signal can be corrected within a pulse sequence. The parameterization can take place according to Equations 4 and 5, for example.

In some examples, the method 100 may also include creating the synthetic aperture based on the corrected radar signal. The method 100 can use the corrected radar signal to facilitate the construction of the synthetic aperture since dynamic objects in the target region can be ignored. For example, creating the synthetic aperture comprises constructing an image of the target region based on the corrected radar signal. Accordingly, the method 100 based on the corrected radar signal can contribute to an improved detection of the surroundings.

To create the synthetic aperture, each echo can be arranged virtually at equidistant spatial intervals along a movement trajectory of the radar sensor. Each echo can be projected into a discrete image plane to enable coherent integration, taking into account unavoidable non-linearities during the measurement process. The dimensioning of the projection can correspond to the field of view of the radar sensor.

Figure 4A:
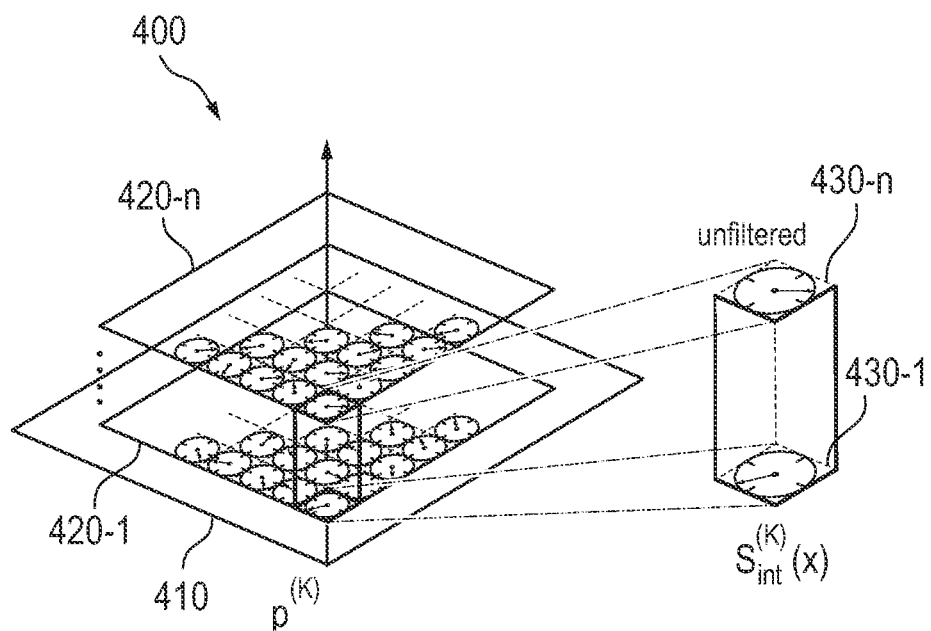
FIGS. 4*a*, 4*b*, and 4*c* show a model representation of a projection of a radar signal into an image plane, according to some aspects of the present disclosure.
Figure 4B:
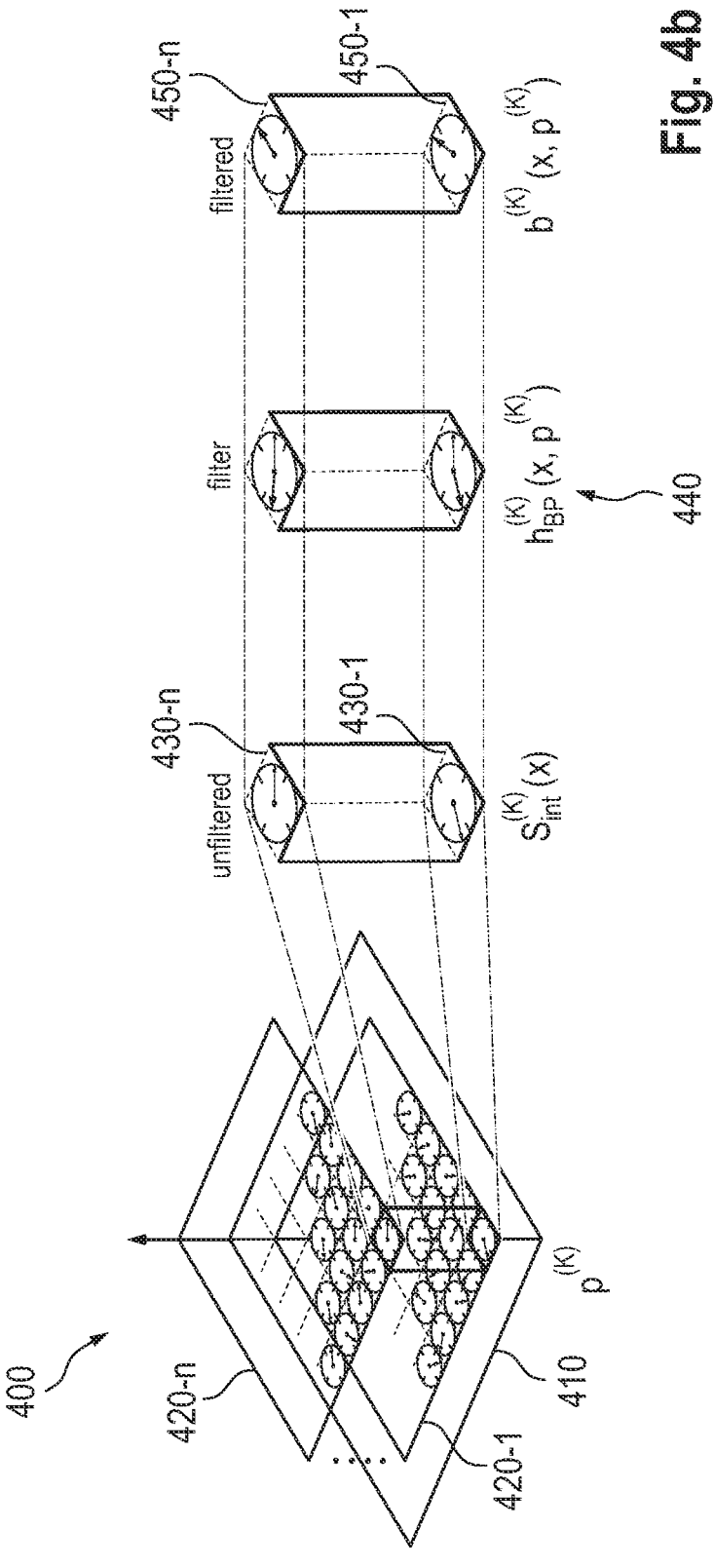
Figure 4C:
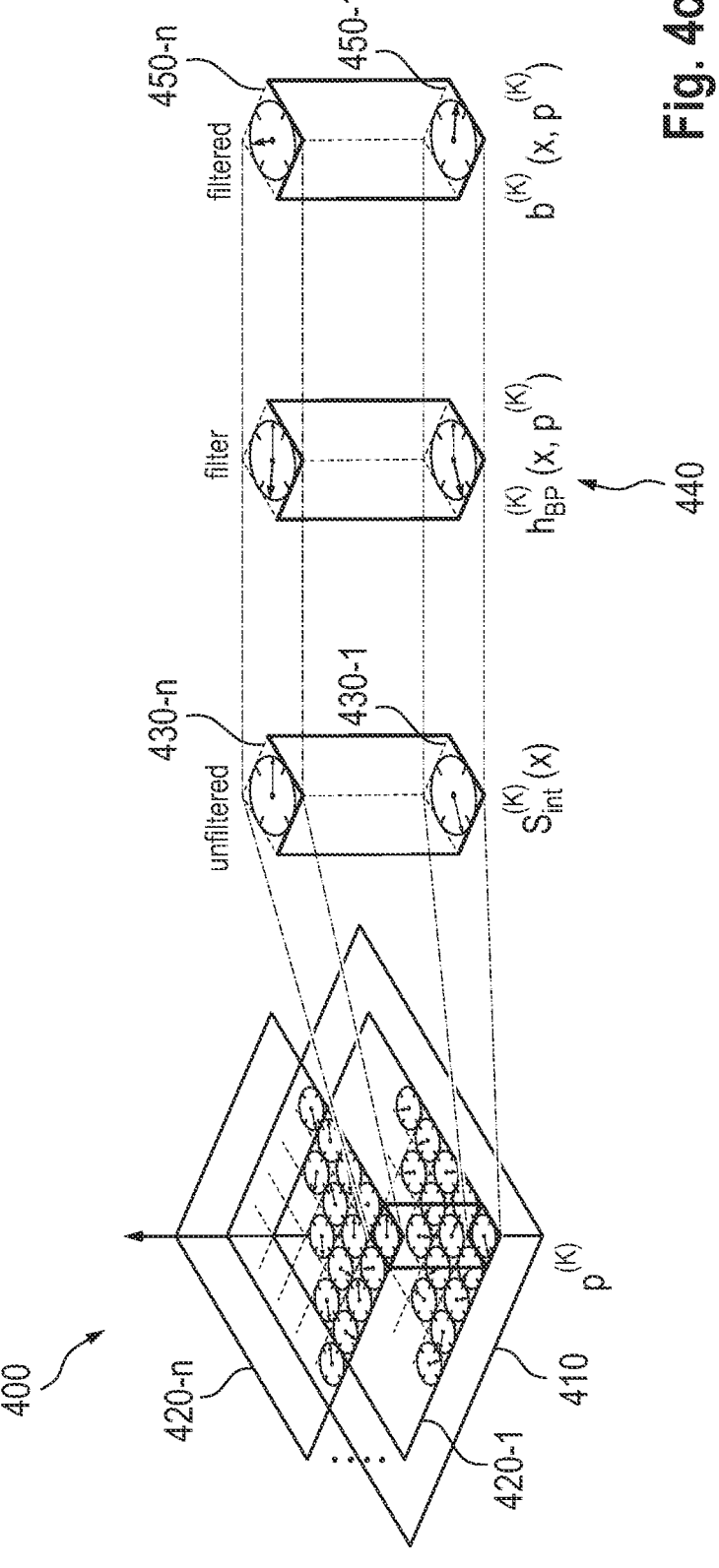

The examples of FIGS. 4a to 4c show a model representation of an example of a projection 400 of a radar signal into an image plane 410, the projection 400 comprising a respective sub-projection 420-1 to 420-n of each echo of a sequence of echoes of the radar signal into the image plane 410. Each sub-projection 420-1 to 420-n indicates a respective phase position of each pixel in the image plane 410. The pixels can be defined by the projection signal $S_{int}^{(K)}(x)$, where x is the coordinate of the pixel and κ is the index of the measurement position p along the synthetic aperture.

If the design process of the synthetic aperture were not subject to the influence of dynamic target objects, the influencing variable $v_r$ in Equation 1 could be set to zero, so that the radar signal can be described according to Equation 12:

$$s(t, k) = A\exp\left(2\pi j \frac{2}{\lambda_c} d_r\right) \sum_{k=0}^{k-1} \exp\left(2\pi j 2 \frac{\Delta f}{c_0 T} d_r t\right) \qquad \text{Equation 12}$$

A direct projection of the Fourier transformation $S(u)=F\{s(t,k)\}$ of Equation 12 into the image plane 410, taking into account equidistant measurement positions, can result in a phase difference between corresponding pixels of the sub-projections 420-1 to 420-n, for example, pixels 430-1 and 430-n, in the unfiltered state. This phase difference may be caused by the range variation of the target region in successive echoes.

In view of the varying phase angles, a coherent integration of pixels with the same coordinates can be difficult. In the extreme case, the phase variation can lead to a complete cancellation of the signal energy. Therefore, it may be necessary to adjust the phase position of the projected pixels of the image plane 410 as a function of the measurement position as part of a further data processing step of creating the synthetic aperture. This process can be based on a previous Fourier transformation of the radar signal and information on the recording position of the measurement signals. The phase position can be adjusted by designing a compensation filter (e.g., a back-projection filter), so that the projected signal energy of several consecutive measurements can be coherently integrated within a pixel.

Such a compensation filter $h_{BP}$ could be set according to Equation 13:

$$h_{BP}(x, k) = \exp\left(-2\pi j \frac{2}{\lambda_c} \|x - \eta(k)\|_2\right) \qquad \text{Equation 13}$$

The compensation filter $h_{BP}$ can be applied to each pixel of coordinates x in the image plane 410 considering each measurement position η(K) in order to compensate for the incoherence of the projection signal $S_{int}^{(K)}(x)$ and cause a focusing of the radar signal in the image space. Filtering 440 of the projected pixels 430-1 and 430-n results in filtered pixels 450-1 and 450-n with an adjusted phase position. The synthetic aperture can thus be (re)constructed from the filtering and the integration of the echoes.

FIG. 4b shows the filtered pixels 450-1 and 450-n for a substantially static target region. FIG. 4c shows the filtered pixels 450-1 and 450-n for a dynamic target region. From the phase difference of the filtered pixels 450-1 and 450-n shown in FIG. 4c, it becomes clear that—if the assumption of a static target region during the design process of the synthetic aperture is not correct—the application of the compensation filter $h_{BP}$ may not be sufficient to achieve the desired coherence. The compensation filter $h_{BP}$ only compensates for distance-dependent phase components without taking speed-dependent phase terms into account.

The method 100 according to the present disclosure can be used to provide a corrected radar signal in which such speed-dependent phase terms are at least partially compensated before the synthetic aperture is constructed on the basis of a pulse sequence. This can help achieve the necessary coherence for a focused reconstruction of the target region.

Conventional synthetic aperture radar (SAR) systems that can be used in the surroundings of the vehicle require a static environment during the synthetic aperture design process. Dynamic objects, such as pedestrians moving through the scenario while a parking space is being measured, inevitably lead to incorrect target reports with conventional SAR evaluation methods. A speed-dependent phase term can appear within the echoes of the measurement signal. This phase term results in the defocusing and erroneous projection of the reconstructed scenario.

The method 100 can allow the realization of a large antenna array by synthesizing equidistantly consecutive individual radar measurements for imaging the perception of the surroundings, taking into account dynamic and static objects in the measuring range of the radar sensor.

The method 100 can serve for the use of radar sensors used in the automotive surroundings for the construction and reconstruction of synthetic apertures with correct consideration of dynamic objects. The method 100 can increase a detection probability through coherent integration of the echoes. The method 100 can compensate for speed-dependent phase terms in favor of improved focusing and avoidance of false projections. The method 100 can allow a cost-effective implementation of the environment detection due to the reuse of conventionally used radar sensors (rear/side radar) of a vehicle. The radar sensors can be manufactured cheaply and suitably for series production and can be installed or concealed in the vehicle with seamless integration.

Figure 5:
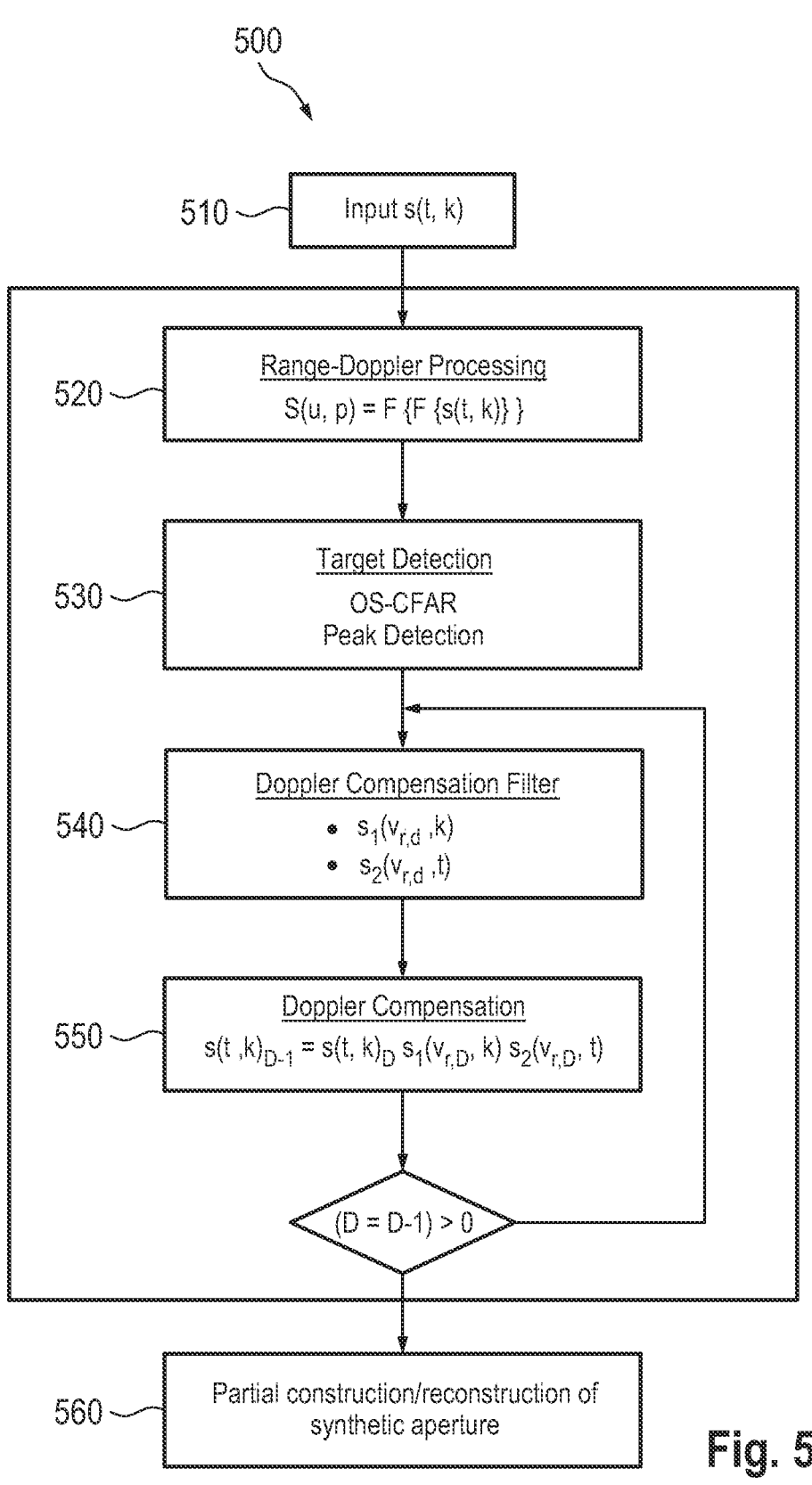
FIG. 5 shows a flow chart of a further example of a method for correcting a radar signal to determine a synthetic aperture, according to some aspects of the present disclosure.

FIG. 5 shows a flow chart of a further example of a method 500 for correcting a radar signal for determining a synthetic aperture.

The method 500 comprises receiving 510 data indicative of the radar signal, the radar signal having a sequence of echoes from a target region and being based on a sequence of transmission pulses.

Furthermore, the method 500 comprises determining a movement of at least one target object in the target region. In the example shown in FIG. 5, determining the movement comprises determining 520 a speed of the target object by a two-dimensional Fourier transformation of the radar signal (by transforming the radar signal into a Doppler range). For example, a pulse sequence (ramp/chirp sequence) of frequency-modulated continuous wave (FMCW) transmission signals can be used to determine speed.

The method 500 further comprises detecting 530 dynamic target objects in the target region and determining 540 correction information for the radar signal based on the movement of the target object. The correction information can be determined according to Equations 4 and 5, for example. The dynamic target objects can be detected in addition to static target objects in the target region within a two-dimensional frequency spectrum (range Doppler matrix) by conventional detection methods such as constant false alarm rate (CFAR). The speed of dynamic target objects can be determined and reported in a metric system of units (m/s) by evaluating the Doppler signal.

The method 500 further comprises reducing 550 an influence of the movement of the target object on the radar signal based on the correction information in order to obtain a corrected radar signal. The correction information can be provided for parameterizing at least one filter for reducing the influence of the movement of each of the detected target objects on the radar signal. The influence of the movement of the target objects on the radar signal is reduced iteratively for each detected target object. The reduction in the influence of movement on the radar signal can be achieved, for example, by compensating for the phase terms of dynamic target objects within a pulse sequence using parameterizable compensation filters (e.g., in the form of a parallel filter bank).

The method 500 optionally comprises creating 560 the synthetic aperture based on the corrected radar signal. Creating the synthetic aperture may comprise constructing an image of the target region based on the corrected radar signal. For example, the echoes can be arranged equidistantly along a trajectory of the radar sensor to construct the synthetic aperture. The synthetic aperture can be constructed successively by back projection.

Further embodiments of the present disclosure relate to a computer program for carrying out a method according to the present disclosure, for example method 100 or 500, when the computer program runs on a computer, a processor, or a programmable hardware component. The computer program can compensate for signal distortions in the radar signal due to dynamic objects in the target region, thus making it possible to create a virtual static image of the target region. The computer program can support imaging reconstruction of the target region by reducing defocus and erroneous projection of dynamic parts of the target region.

Figure 6:
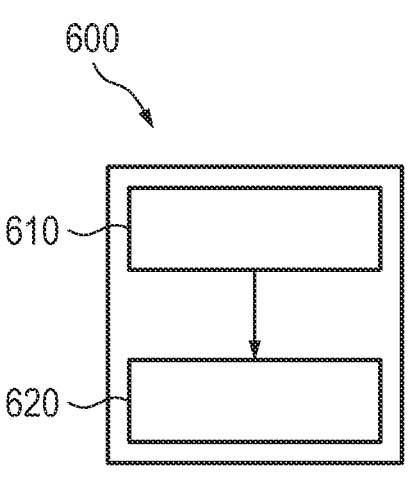
FIG. 6 shows an example of a device for correcting a radar signal for determining a synthetic aperture, according to some aspects of the present disclosure.

FIG. 6 shows an example of a device 600 for correcting a radar signal for determining a synthetic aperture. The device 600 comprises an interface circuit 610 which is designed to receive data indicative of the radar signal. The radar signal has a sequence of echoes from a target region and is based on a sequence of transmission pulses.

The device 600 also comprises a processing circuit 620 that is designed to determine a movement of at least one target object in the target region, to determine correction information for the radar signal based on the movement of the target object, and to reduce an influence of the movement of the target object on the radar signal based on the correction information to obtain a corrected radar signal.

The device 600 can compensate for signal distortions in the radar signal due to dynamic objects in the target region and thus make it possible to generate a virtually static image of the target region. The device 600 can support imaging reconstruction of the target region by reducing defocus and erroneous projection of dynamic parts of the target region.

Further details and aspects of the device 600 are mentioned in connection with the above-described embodiments of a method according to the present disclosure, such as method 100 or 500. The embodiment of the device 600 shown in FIG. 6 may comprise one or more optional additional features corresponding to one or more aspects mentioned in the context of the proposed technique or one or more embodiments described above (e.g. referring to FIG. 1).

The device 700 according to the present disclosure can be a local computing device, such as a radar sensor or central computer coupled to the radar sensor of a vehicle, having one or more processors and one or more storage devices, or a distributed computing system (e.g., a cloud computing system with one or more processors or one or more storage devices distributed at different locations, for example, at a local client and/or one or more remote server farms and/or data centers).

The device 700 according to the present disclosure can comprise any circuit or combination of circuits. In one embodiment, the device 700 may comprise one or more processors, which may be of any type. As used herein, processor can mean any type of processing circuitry, such as, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field programmable gate array (FPGA), or any other type of processor or processing circuitry. Other types of circuitry that may be included in the device 700 may be a custom made circuit, an application specific integrated circuit (ASIC), or the like, such as one or more circuits (e.g., a communications circuit) for use in wireless devices.

The device 700 may comprise one or more storage devices, which may comprise one or more storage elements appropriate for the particular application, such as main memory in the form of read only memory (RAM), one or more hard drives, and/or one or more drives handling removable media such as CDs, flash memory cards, DVD, and the like. The device 700 may also comprise a display device, one or more speakers, and a keyboard and/or controller, which may comprise a mouse, trackball, touch screen, voice recognition device, or any other device that allows a system user to enter information into the device 700 and receive information therefrom, e.g., a surroundings model of the target region.

Some or all of the method steps may be performed by (or using) a hardware device, such as a processor, microprocessor, programmable computer, or electronic circuit. In some embodiments, one or more of the main method steps can be performed by such a device.

Depending on particular implementation requirements, embodiments of the present disclosure can be implemented in hardware or software. The implementation can be performed with a non-volatile storage medium such as a digital storage medium such as a floppy disk, a DVD, a Blu-Ray, a CD, a ROM, a PROM and EPROM, an EEPROM, or a FLASH memory on which electronically readable control signals are stored which interact (or can interact) with a programmable computer system in such a way that the respective method is carried out. Therefore, the digital storage medium can be computer-readable.

Some embodiments according to the present disclosure comprise a data carrier with electronically readable control signals which can interact with a programmable computer system so that one of the methods described herein is carried out.

In general, embodiments of the present disclosure may be implemented as a computer program product having program code, wherein the program code is operable to perform one of the methods when the computer program product is run on a computer. The program code can be stored on a machine-readable carrier, for example.

Further embodiments comprise the computer program for performing one of the methods described herein, which is stored on a machine-readable medium.

In other words, an embodiment of the present disclosure is therefore a computer program with a program code for performing one of the methods described herein when the computer program runs on a computer.

Another embodiment of the present disclosure is a storage medium (or a data carrier or a computer-readable medium) comprising stored thereon a computer program for performing one of the methods described herein when executed by a processor. The data carrier, the digital storage medium, or the recorded medium is usually tangible and/or not seamless. Another embodiment of the present disclosure is a device, as described herein, comprising a processor and the storage medium.

Another embodiment of the present disclosure is a data stream or signal sequence representing the computer program for performing one of the methods described herein. For example, the data stream or signal sequence may be configured to be transmitted over a data communications link, such as the Internet.

Another embodiment comprises a processing means, for example, a computer or a programmable logic device, configured or adapted to perform any of the methods described herein.

Another embodiment comprises a computer on which the computer program for executing one of the methods described herein is installed.

Another embodiment according to the present disclosure comprises a device or system configured to transmit (e.g., electronically or optically) a computer program for performing any of the methods described herein to a recipient. For example, the recipient may be a computer, mobile device, storage device, or the like. For example, the device or system may comprise a file server for transmitting the computer program to the recipient.

In some embodiments, a programmable logic device (e.g., a field programmable gate array, FPGA) may be used to perform some or all of the functionality of the methods described herein. In some embodiments, a field programmable gate array may cooperate with a microprocessor to perform any of the methods described herein.

Figure 7:
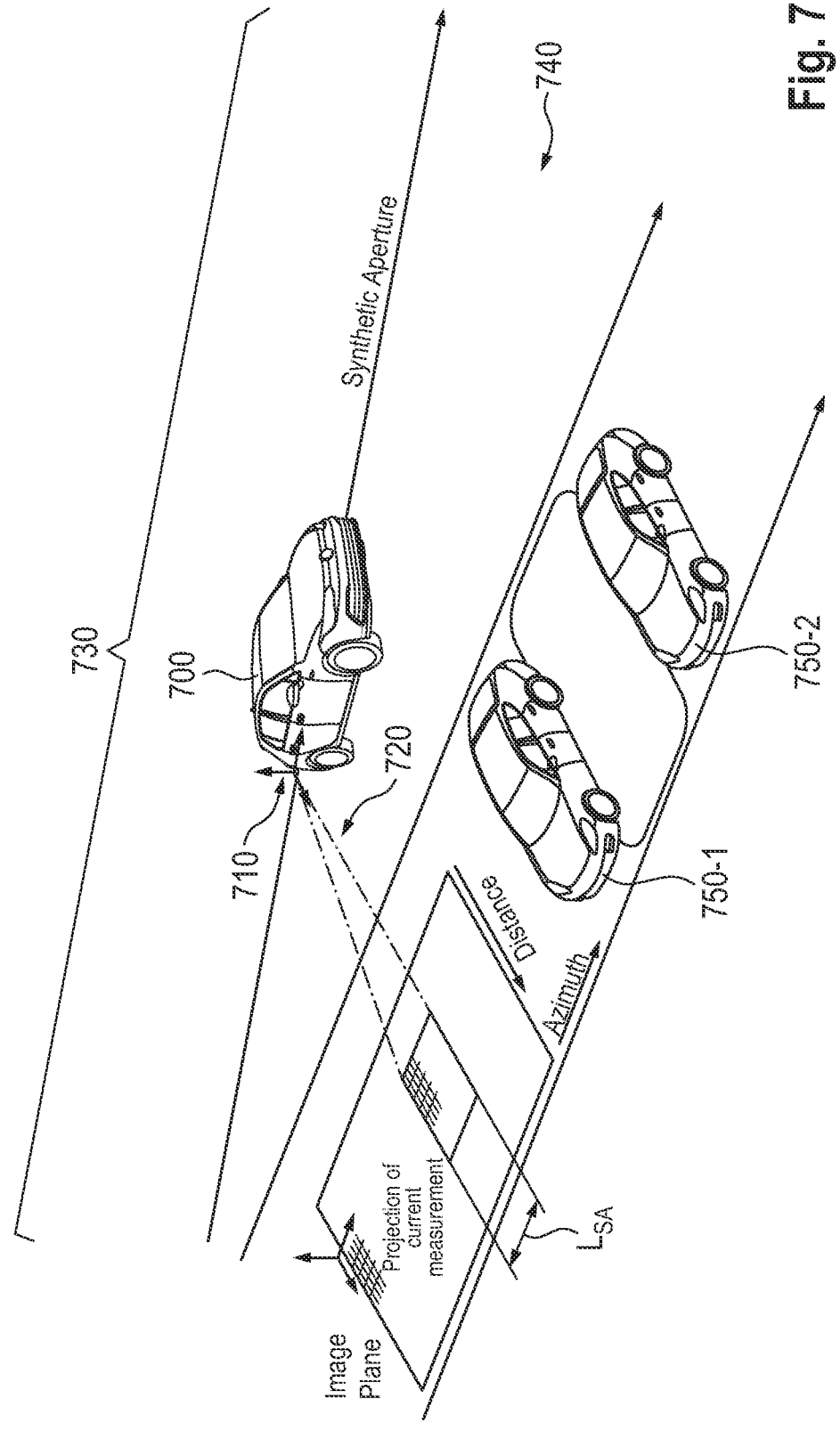
FIG. 7 shows an example of a vehicle in a target region to be detected, according to some aspects of the present disclosure.

FIG. 7 shows an example of a vehicle 700 that includes a device 710 according to the present disclosure for correcting a radar signal 720 for determining a synthetic aperture 730. The device 710 comprises an interface circuit that is designed to receive data indicative of the radar signal 720. The radar signal 720 has a sequence of echoes from a target region 740 and is based on a sequence of transmission pulses.

The device 710 further comprises a processing circuit that is designed to determine a movement of at least one target object, e.g., target object 750-1 or 750-2, in the target region 740, to determine correction information for the radar signal 720 based on the movement of the target object 750-1, 750-2 and to reduce an influence of the movement of the target object 750-1, 750-2 on the radar signal 720 based on the correction information to obtain a corrected radar signal.

The vehicle 700 can have an improved surroundings detection compared to vehicles with conventional radar technology for creating a synthetic aperture.

The embodiments described above are merely illustrative of the principles of the present present disclosure. It is understood that modifications and variations of the arrangements and details described herein will be apparent to others skilled in the art. Therefore, it is intended that the present disclosure be limited only by the scope of the following claims and not by the specific details presented in the description and explanation of the embodiments herein.

LIST OF REFERENCE SIGNS

100 Method
110 to 140 Method steps
200 Radar signal
210-1 to 210-$n$ Echoes
220-1 to 220-$n$ Transmission pulses 300 Transform
310-1 to 310-$n$ Echoes
320 Fourier transformation
330-1 to 330-$n$ Distance vectors
340 Fourier transformation
350 Range-Doppler matrix
360 Range-Doppler map
400 Projection
410 Image plane
420-1 to 420-$n$ Sub-projection
430-1, 430-$n$ Pixel
440 Compensation filter
450-1, 450-$n$ Filtered pixels
500 Method
510 to 560 Method steps
600 Device
610 Interface circuit
620 Processing circuit
700 Motor vehicle
710 Device
720 Radar signal
730 Synthetic aperture
740 Target region
750-1, 750-2 Target objects

The invention claimed is:

1. A method for correcting a radar signal to determine a synthetic aperture, comprising:
   receiving data indicative of the radar signal, the radar signal having a sequence of echoes from a target region and being based on a sequence of transmission pulses;
   determining movement of at least one target object in the target region during the sequence of transmission pulses;
   determining correction information of the radar signal based on the determined movement of the target object, wherein the correction information corresponds to a movement-induced phase component of the radar signal associated with the movement of the target object; and
   reducing a phase distortion in the radar signal caused by the movement of the target object by compensating the movement-induced phase component using the correction information to obtain a corrected radar signal.

2. The method according to claim 1, further comprising creating the synthetic aperture based on the corrected radar signal.

3. The method according to claim 2, wherein creating the synthetic aperture comprises constructing an image of the target region based on the corrected radar signal.

4. The method according to claim 1, wherein determining the movement of the at least one target object comprises determining a speed of the target object by a two-dimensional Fourier transformation of the radar signal.

5. The method according to claim 4, wherein determining the speed of the at least one target object comprises transforming the radar signal into a Doppler range.

6. The method according to claim 1, further comprising:
   detecting a plurality of moving target objects in the target region;
   determining a respective portion of correction information of the radar signal based on a movement of each of the detected target objects; and
   reducing phase distortions in the radar signal caused by the movement of each of the detected target objects based on the respective correction information to obtain the corrected radar signal.

7. The method according to claim 6, wherein the influence of the movement of the target objects on the radar signal is iteratively reduced for each of the detected target objects.

8. The method according to claim 6, further comprising providing the respective correction information for parameterizing at least one respective filter for reducing the influence of the movement of each of the detected target objects on the radar signal.

9. The method according to claim 1, wherein the correction information is determined based on a movement-induced Doppler frequency shift in the radar signal.

10. The method according to claim 1, wherein the correction information is determined based on a movement-induced phase difference between at least two echoes in the sequence of echoes in the radar signal.

11. The method according to claim 1, wherein a first piece of correction information $s_1$ is determined according to $$s_1(v_{r,d}, k) = \exp\left(-2\pi j k T_{RRI}\frac{2}{\lambda_c}v_{r,d}\right)$$

wherein k is an index of a transmission pulse in the sequence of transmission pulses, $T_{RRI}$ is a time difference between two consecutive transmission pulses in the sequence of transmission pulses, $v_{r,d}$ is a radial speed of the target object, and $\lambda_c$ is a wavelength of the transmission pulse in the sequence of transmission pulses, and the correction information is based on the first correction information $s_1$.

12. The method according to claim 11, wherein a piece of second correction information $s_2$ is determined according to $$s_2(v_{r,d}, t) = \exp\left(-2\pi j \frac{2}{\lambda_c}v_{r,d}t\right)$$

wherein $v_{r,d}$ is a radial speed of the target object, $\lambda_c$ is a wavelength of a transmission pulse in the sequence of transmission pulses, and t is a measurement time of an echo in the sequence of echoes, and wherein the correction information is based on the second correction information $s_2$.

13. The method according to claim 12, further comprising applying a compensation filter to the corrected radar signal during creation of the synthetic aperture, the compensation filter being configured to adjust a phase position of projected pixels of an image plane as a function of respective measurement positions of the transmission pulses.

14. A device for correcting a radar signal for determining a synthetic aperture, comprising:

an interface circuit configured to receive data indicative of the radar signal, the radar signal including a sequence of echoes from a target region and being based on a sequence of transmission pulses; and a processing circuit configured to:

determine a movement of at least one target object in the target region during the sequence of transmission pulses, determine correction information of the radar signal based on the determined movement of the target object, wherein the correction information corresponds to a movement-induced phase component of the radar signal associated with the movement of the target object, and reduce a phase distortion in the radar signal caused by the movement of the target object by compensating the movement-induced phase component using based on the correction information to obtain a corrected radar signal.

15. The device according to claim 14, further comprising creating the synthetic aperture based on the corrected radar signal.

16. The device according to claim 15, wherein creating the synthetic aperture comprises constructing an image of the target region based on the corrected radar signal.

17. The device according to claim 14, wherein determining the movement of the at least one target object comprises determining a speed of the target object by a two-dimensional Fourier transformation of the radar signal.

18. The device according to claim 17, wherein determining the speed of the at least one target object comprises transforming the radar signal into a Doppler range.

19. The device according to claim 14, further comprising:

detecting a plurality of moving target objects in the target region;

determining a respective portion of correction information of the radar signal based on a movement of each of the detected target objects; and reducing an influence of the movement of each of the detected target objects on the radar signal based on the respective correction information to obtain the corrected radar signal.

20. A non-transitory computer-readable medium including program instructions on a storage medium, configured to correct a radar signal to determine a synthetic aperture, comprising:

instructions for receiving data indicative of the radar signal, the radar signal having a sequence of echoes from a target region and being based on a sequence of transmission pulses;

instructions for determining movement of at least one target object in the target region during the sequence of transmission pulses;

instructions for determining correction information of the radar signal based on the determined movement of the target object, wherein the correction information corresponds to a movement-induced phase component of the radar signal associated with the movement of the target object; and instructions for reducing a phase distortion in the radar signal caused by the movement of the target object by compensating the movement-induced phase component using based on the correction information to obtain a corrected radar signal.

\* \* \* \* \*